United States Patent [19]

Hagedorn et al.

[11] 4,305,746
[45] Dec. 15, 1981

[54] METHOD OF AND APPARATUS FOR BENDING GLASS SHEETS

[75] Inventors: Floyd T. Hagedorn, Oregon; Robert G. Revells, Toledo; James A. Bushong, Swanton, all of Ohio

[73] Assignee: Libbey-Owens-Ford Company, Toledo, Ohio

[21] Appl. No.: 145,467

[22] Filed: May 1, 1980

[51] Int. Cl.³ .......................................... C03B 23/023
[52] U.S. Cl. ..................................... 65/106; 65/104; 65/107; 65/268; 65/273; 65/287
[58] Field of Search ................. 65/104, 106, 273, 268, 65/287, 107

[56] References Cited

U.S. PATENT DOCUMENTS

| | | | |
|---|---|---|---|
| 3,485,618 | 12/1969 | Ritter, Jr. | 65/106 |
| 3,545,951 | 12/1970 | Nedelec | 65/104 |
| 3,881,906 | 5/1975 | Ritter et al. | 65/104 |
| 3,905,794 | 9/1975 | Revells et al. | 65/106 |

*Primary Examiner*—Arthur D. Kellogg
*Attorney, Agent, or Firm*—Collins, Oberlin & Darr

[57] ABSTRACT

A method of and apparatus for press bending sheets into complex shapes including at least one press member of outline or ring-type construction having a plurality of shaping pads mounted within the outline of the shaping ring in combination with configurated conveyor rolls for preliminarily bending a heat-softened glass sheet prior to final bending into the ultimately desired configuration.

14 Claims, 13 Drawing Figures

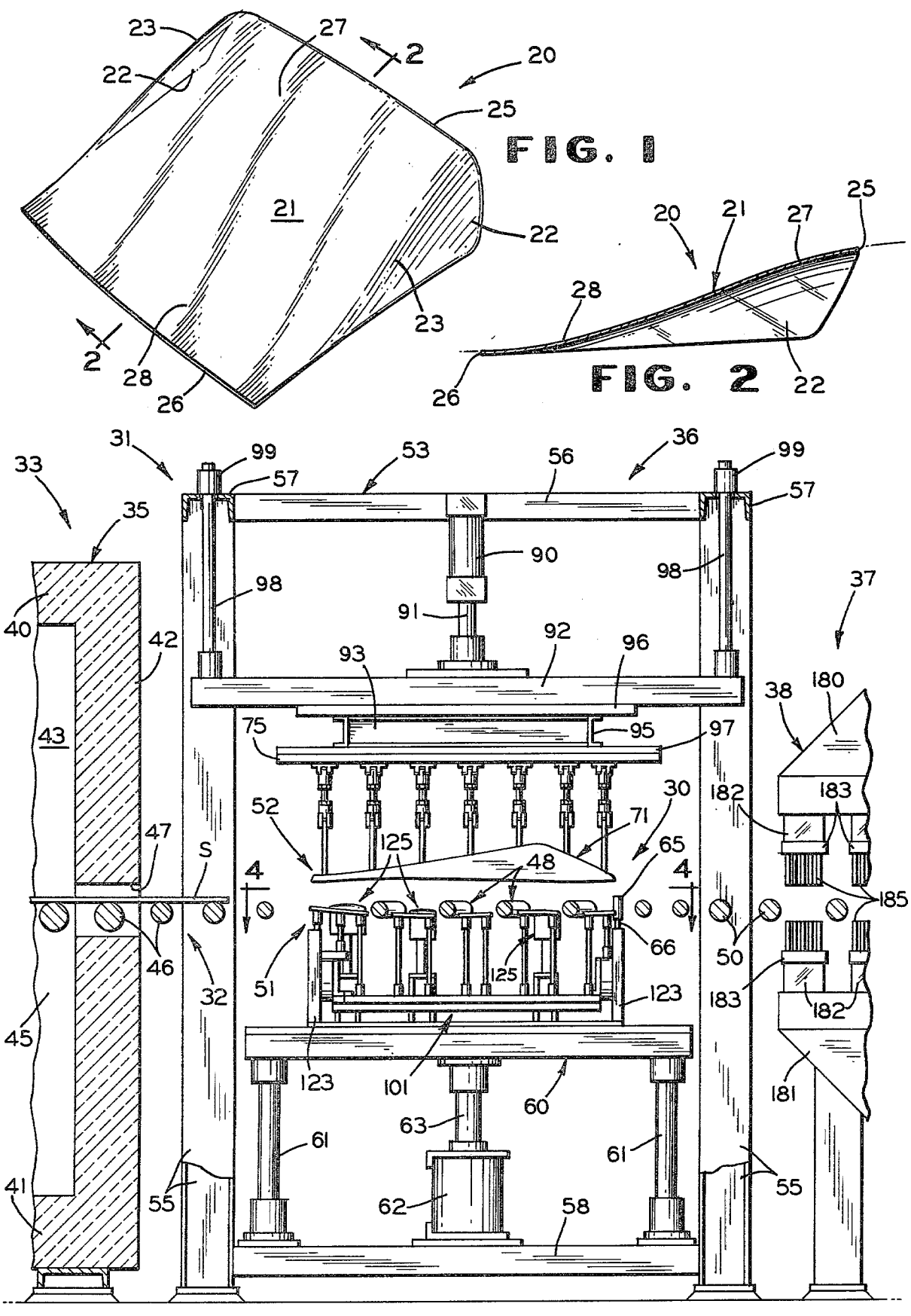

METHOD OF AND APPARATUS FOR BENDING GLASS SHEETS

BACKGROUND OF THE INVENTION

The present invention relates generally to the production of bent glass sheets and, more particularly, to an improved method of and apparatus for bending specially configurated glass sheets.

Bent sheets of glass are commonly used as glazing closures in vehicles such as automobiles and the like. It is often desirable to shape or form the glass in a manner to carry out styling features found in the adjacent sheet metal components in order to create the appearance of unity between the glass and the sheet metal. For example, in a recent proposed design, it is desirable to provide an automotive backlight having inturned side portions extending into the side surfaces of the vehicle and a main body portion having a so-called "S" shape or reverse bend for gradually merging at its upper and lower ends into the roof line of the vehicle as well as the deck lid, respectively. The attainment of such shapes is virtually impossible with conventional gravity type and press type bending molds. While the modified press ring disclosed in U.S. patent application Ser. No. 1,174, filed Jan. 5, 1979, functions admirably in effecting a reverse bend, it cannot, of itself, repeatedly impart the desired complex, irregular shape described above.

SUMMARY OF THE INVENTION

Accordingly, it is an object of the present invention to provide an improved method of and apparatus for bending glass sheets into more complex shapes than heretofore possible.

It is another object of this invention to provide in the foregoing method and apparatus an arrangement for preliminarily bending a glass sheet toward its ultimately desired configuration.

It is still another object of the present invention to provide a press apparatus retaining the advantages found in the modified outline-type press member of U.S. patent application Ser. No. 1,174, filed Jan. 5, 1979, in combination with other features to effect the desired complex shape in a heated glass sheet.

It is a further object of this invention to combine with the foregoing press apparatus irregularly shaped conveyor rolls for prebending a glass sheet immediately prior to the final press bending thereof.

The foregoing and other objects, advantages, and characterizing features of the present invention will become clearly apparent from the ensuing detailed description thereof considered in conjunction with the accompanying drawings wherein like reference numerals denote like parts throughout the various views.

BRIEF DESCRIPTION OF THE DRAWINGS

FIG. 1 is a perspective view of a specially configurated glazing closure produced in accordance with the method and apparatus of this invention;

FIG. 2 is a cross sectional view, taken along line 2—2 of FIG. 1;

FIG. 3 is a side elevational view, partly in section, of a bending apparatus embodying the novel features of this invention, and shown interposed between a heating and tempering station;

DESCRIPTION OF THE PREFERRED EMBODIMENT

Figure 4:
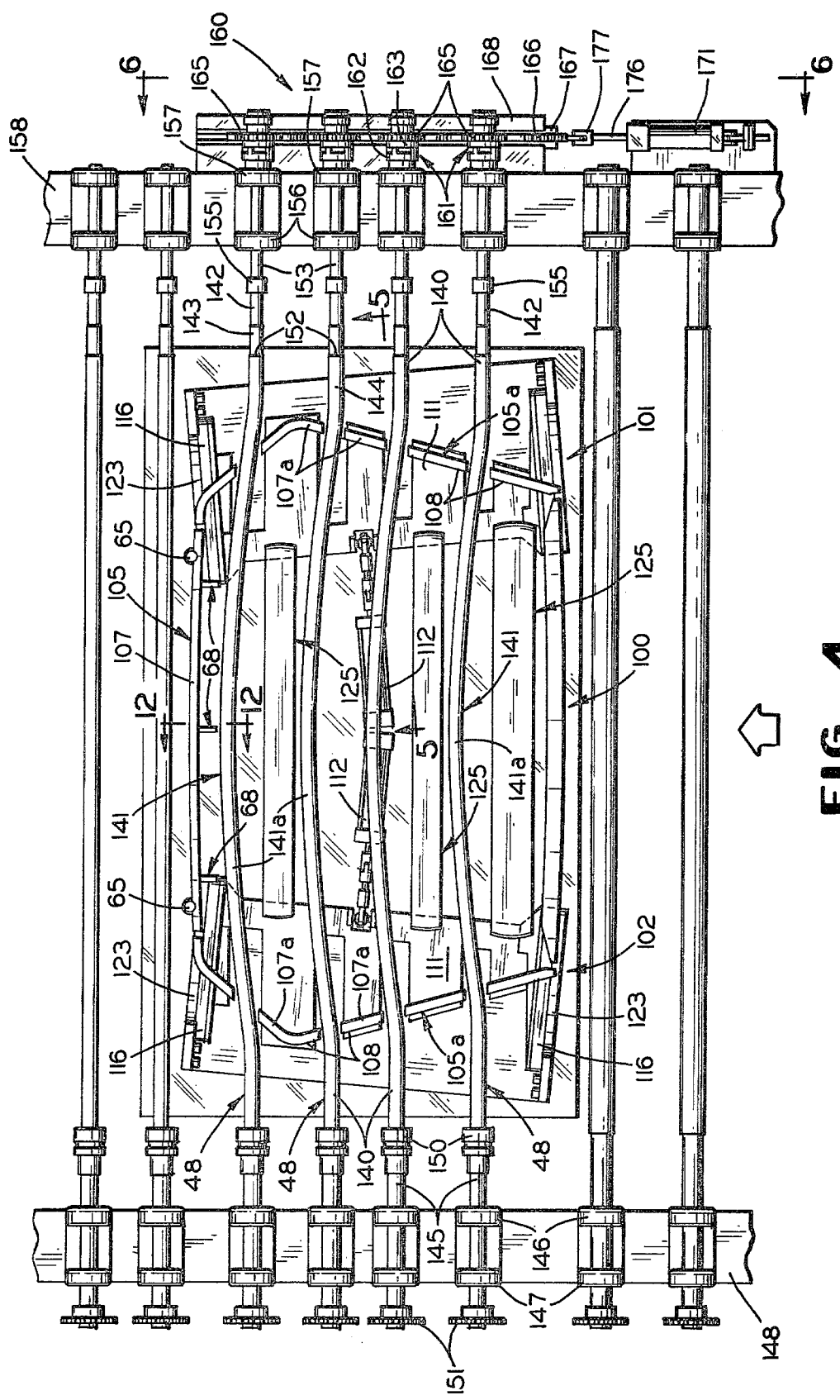
FIG. 4 is a horizontal sectional view through the bending station taken along the line 4—4 of FIG. 3, and showing one form of a lower press member and conveyor roll arrangement in plan.

Referring now in detail to the illustrative embodiment depicted in the accompanying drawings, there is shown in FIG. 1 a glazing closure 20 bent to the desired configuration in accordance with the method and apparatus of this invention and which is intended for use as a backlight in an automotive design embodying new styling features. The backlight 20 is comprised of a monolithic glass sheet having a central body portion 21 and inturned opposite end or side portions 22 bent at relatively sharp or abrupt angles about axes 23 which extend from one longitudinal edge 25 toward the other longitudinal edge 26 and terminate inwardly from the latter. The central body portion 21 is formed with a slight or gradual convex curvature about a central transverse axis and a slightly convexly curved upper portion 27 in the crosswise direction which merges into a reversely bent, concavely curved lower portion 28. The upper marginal edge 25 of backlight 20 is adapted to extend into the roof line of the vehicle when installed while the lower marginal edge 26 extends into the deck lid and forms a part thereof to create the appearance of unity between the glass and the sheet metal of the vehicle body. As used herein, the terms upper, lower, top, bottom, horizontal, vertical and the like are applied only for convenience of description with reference to FIGS. 1 and 2 of the drawings and should not be taken as limiting the scope of this invention. While it will be convenient to describe the method and apparatus of this invention in connection with the shaping of a single glass sheet having sharp inturned end portions and a reversely bent, crosswise curvature, it should be understood that the principles of this invention are equally applicable in the production of glass sheets having reversely bent curvatures in any direction and/or multiple layered sheets of glass, such as conventional laminated windshields for example.

Referring now in detail to the illustrative embodiment for carrying out this invention, there is shown in FIG. 3 an improved bending apparatus, generally designated 30, constructed in accordance with this invention and hereinafter more fully described, embodied in a horizontal glass sheet bending and tempering apparatus, comprehensively designated 31. Apparatus 31 includes a continuous conveyor system 32 adapted to support a plurality of sheets S for movement in a generally horizontal path through a heating station 33 having a furnace 35 for heating the sheets to their softening point or bending temperatures, a bending station 36 embodying the novel apparatus 30 of this invention for bending the heated sheets S to the desired complex, irregular shape, and a tempering station 37 having chilling means 38 for rapidly reducing the temperature of the bent sheets to produce the desired temper therein.

In the illustrative embodiment, the glass sheets S are heated in the furnace 35, which is of the tunnel-type having a top wall 40, a bottom wall 41, a rear end wall 42, and opposite side walls 43, all formed of a suitable refractory material and defining a heating chamber 45. The heating chamber 45 can be heated in any desired manner by suitable heating means, such as gas burners or electrical resistance elements for example (not shown) located in the top and side walls of furnace 35. Such heating means are suitably controlled by apparatus (also not shown) to obtain the desired temperature in various zones within the heating chamber 45. The sheets S are carried through the heating chamber 45 of the furnace on a series of conveyor rolls 46 forming a part of the conveyor system 32 and extending transversely across the chamber 45 with their opposite ends projecting through the opposite walls 43 and suitably journalled in bearing blocks (not shown) located exteriorly of and along the side walls of furnace 35.

A plurality of glass sheets S are individually loaded on and supported in a generally horizontal plane on the longitudinally spaced conveyor rolls 46 at the entrance end of the furnace (not shown) and heated in a controlled manner to the desired bending temperature during their passage therethrough. Upon emerging through an opening 47 in the rear end wall 42 of furnace 35, the heated glass sheets S are transferred from conveyor rolls 46 onto a second series of spaced conveyor rolls 48 located in bending station 36 and which also form a part of the conveying system 32. The series of rolls 48 support the glass sheets S horizontally for movement into and within the bending station 36 above the lower press member while preliminarily bending such sheets prior to final shaping by the press members hereinafter described. The rolls 48 also receive the bent sheets after final bending to convey them to the tempering station 37, where they are received upon the series of conveyor rolls 50 and carried thereby through the tempering station 37.

In accordance with this invention, the bending apparatus 30 includes a movable lower press member 51 and an upper press member 52, both suitably mounted within a rigid framework 53, which includes two substantially vertical columns 55 located on each side of the conveyor system and spaced longitudinally therealong with the columns of the opposite sides of the conveyor being laterally aligned. The columns 55 extend upwardly above the upper press member 52 and are tied together at their upper ends by horizontal beams 56 and 57 extending longitudinally and transversely of the conveyor, respectively, and secured at their opposite ends to the aligned columns 55 to form a rigid box-like structure. A base member 58 extends between the upright columns 55 for supporting the lower press member 51 and associated parts. The upper press member 52 is mounted above conveyor rolls 48 while the lower press member 51 is located below the conveyor rolls 48 and mounted on a carriage 60 for vertical reciprocal movement toward and away from the press member 52.

The carriage 60 is supported by a pair of guide members 61 (FIG. 3) and vertically movable by a fluid actuator 62 mounted on base member 58 and having a suitable piston rod 63 for raising and lowering the press member 51 between a lower position beneath conveyor rolls 48 and an upper position thereabove for lifting a heat-softened glass sheet S from the conveyor rolls 48 and pressing the same against the upper press member 52 into the desired shape. After bending, piston rod 63 is retracted to lower the press member 51 below conveyor rolls 48, depositing the bent sheet thereon for advancement into the tempering station 37.

A pair of laterally spaced locator stops 65 are positioned in the path of movement of the advancing glass sheets to interrupt movement thereof and accurately position the same in the desired location relative to lower press member 51. Each stop 65 is secured to the distal end of a piston rod 66 of a fluid actuating cylinder 67 (FIG. 5) mounted on the carriage 60. The cylinders 67 are operative to raise and lower the stops 65 between an upper position above conveyor rolls 48 in the path of movement of the glass sheets S and a lower position therebeneath.

The upper press member 52 is formed with a central body portion 70 and end portions 71 comprised of shaping elements 72. The central body portion 70 is of outline or ring-type construction and comprises spaced shaping rails 73 connected to a base member 75 by a plurality of connecting rods 76. The shaping rails 73 conform in outline to the central body portion 21 of the glass sheets to be bent and are provided with downwardly directed, shaping surfaces 77 to impart the desired curvature to the sheet. Of course, the particular outline of the shaping rails 73, as well as the specific curvature of the shaping surfaces 77, is dictated by the desired finished shape of the central body portion 21 of the sheet being bent and can vary, as desired. Also, in lieu of an outline ring-type shaping surface, the upper press member can have a continuous or partially continuous shaping surface, if desired.

The shaping elements 72 have outline configurations conforming to the outside dimension of the glass side portions 22 and continuous shaping surfaces 78 complementary to the shape adapted to be imparted to the glass side portions 22. Each shaping element 72 is suspended from a plate 79 affixed to base member 75 by a series of connecting members 80 (FIG. 5), each comprised of a link 81 having angularly related legs 82 and 83 and an axially adjustable connecting rod 85. The horizontally extending leg 82 of each link is pivotally mounted, as shown at 86 in FIG. 5, to a rod 87 rigidly secured at its upper end to the plate 79. The adjustability of the threaded connecting rods 85 and the pivotal linkage attached thereto render the shaping element 72 adjustable to accommodate glass sheet side portions bent to various angular attitudes.

The means for supporting the upper press member 52 on frame 53 includes at least one actuating cylinder 90 (FIG. 3) mounted on one of the upper horizontal beams 56 and having a suitable reciprocal piston (not shown) provided with a piston rod 91 connected at its outer end to a vertically reciprocal platen frame 92. The base member 75 of the upper press member 52 is connected to the platen frame 92 for movement therewith by means of supporting structure including interconnected structural members 93 and 95 sandwiched between support plates 96 and 97. A plurality of guideposts 98 are connected at their lower ends to the four corners of platen frame 92, respectively, and extend upwardly through suitable bushings 99 mounted on upper horizontal beams 57 for sliding movement relative thereto to properly guide platen frame 92 during its vertical reciprocal movement.

Figure 5:
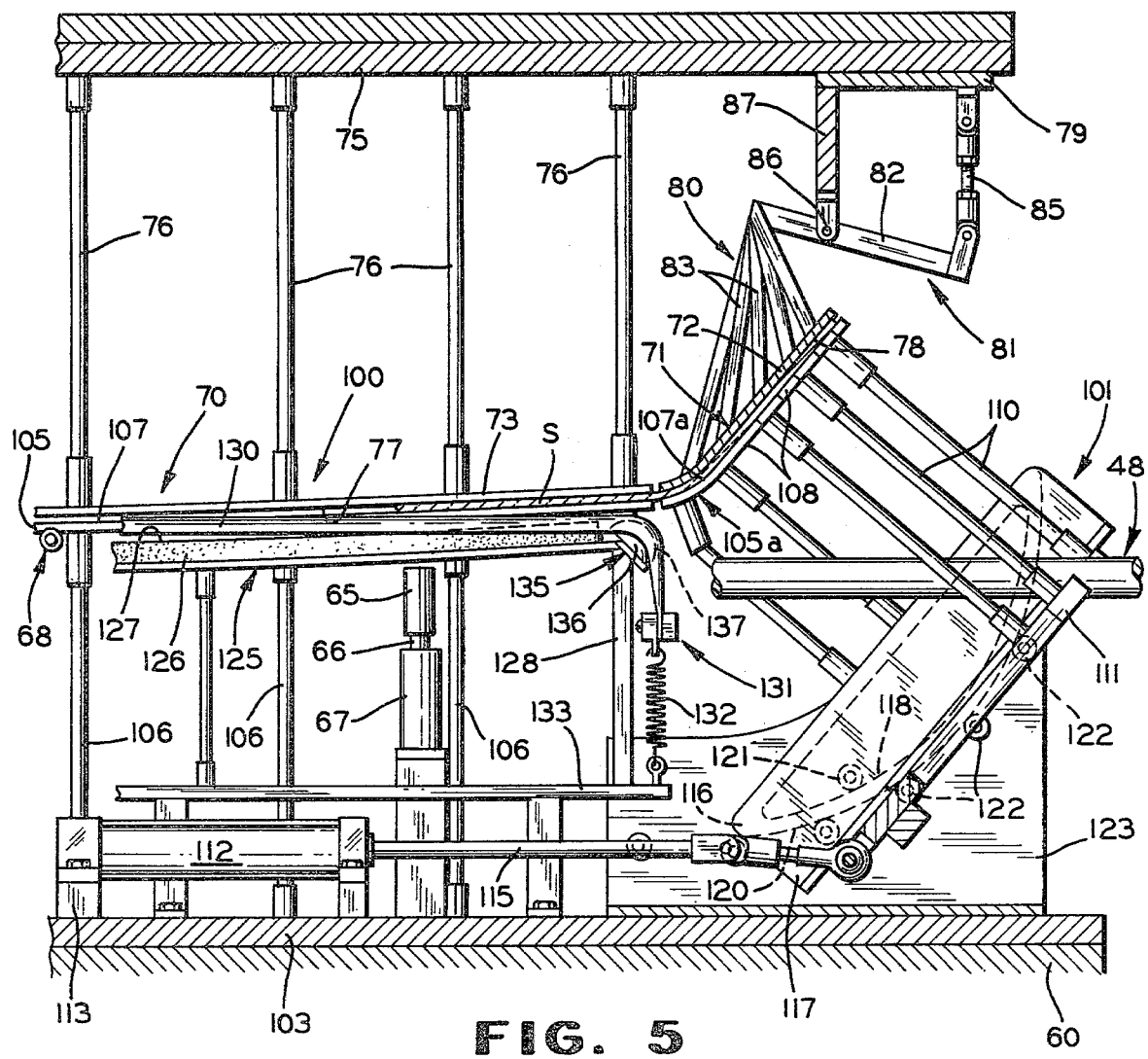
FIG. 5 is a vertical sectional view, on an enlarged scale, taken along the line 5—5 of FIG. 4.

Referring to FIGS. 4 and 5, the lower press member 51 comprises a central, main body section 100 and a pair of opposite, articulated end sections 101 and 102 mounted for pivotal movement relative to the main body section 100 between a lower glass receiving position and an upper press bending position. The main body section 100 comprises a base plate 103 secured to carriage 60 and a shaping rail 105 connected to the base plate 103 in spaced relation thereto via a series of connecting rods 106. The shaping rail 105 conforms to the width of the glass sheets to be bent and is provided on its upper face with a generally concave shaping surface 107.

The press end sections 101 and 102 are substantially identical and mirror images of each other, and each comprises a shaping rail 105a having an upper shaping surface 107a forming a continuation of the shaping surface 107 of the main body section 100. The shaping rails 105 and 105a together conform in outline to the peripheral outline of the glass sheets to be bent. To permit displacement of the shaping rails 105a above the level of conveyor rolls 48 for lifting the glass sheets S thereabove in effecting the desired bend, shaping rails 105a are formed of a plurality of segments 108 (FIG. 4) extending generally transversely of conveyor rolls 48 and spaced apart from each other a sufficient distance to pass between adjacent rolls 48 when raised and lowered. The rolls 48 are formed of a smaller diameter than either of the series of rolls 46 or 50 for the purpose of providing maximum clearance between rolls 48 for the passage of segments 108 therethrough.

The segments 108 constituting shaping rail 105a are connected, via suitable connecting rods 110, to a movable base plate 111 and the parts formed thereon. The plates 111 are mounted for swinging movement in arcuate paths toward each other relative to the main body section 100 by means of fluid cylinders 12 mounted at their head ends to a block 113 secured to the mold base plate 103. Each cylinder 112 is provided with the usual piston having a piston rod 115 suitably pivotally connected to the movable base plate 111.

Means are provided for guiding the press end sections 101,102 in their arcuate movements, such guide means comprising a cam track 116 rigidly secured to an upright bracket 117 affixed to each side of the movable base plate 111. As best shown in FIG. 5, each cam track 116 is formed with an inner cam surface 118 and an outer cam surface 120 adapted to ride on an inner roller 121 and a series of outer rollers 122, respectively, journalled for rotation in an upright mounting plate 123 located adjacent to and outwardly of the associated bracket 117.

In order to effect the reversely bent curvature in the central body portion 21 on the glass sheet, the press members 51 and 52 are provided with shaping pads 125, it being noted that only the shaping pads of the lower press member 51 are depicted in the drawings. Since these shaping pads 125 are of the type shown and described in detail in the hereinbefore mentioned co-pending patent application Ser. No. 1,174, the construction of shaping pads 125 will be only generally described herein. In the form of the invention illustrated in FIG. 4, three such shaping pads 125 are provided on the lower press member 51 while the upper press member 52 has only two such pads.

As best shown in FIG. 5, each shaping pad 125 comprises an elongated, generally concavely curved body 126 extending lengthwise of the press member 51 within the shaping rail 105 and having a lateral dimension smaller than the spacing between adjacent conveyor rolls 48 to permit passage therebetween upon vertical movement of the lower press member 51. The body 126 is of a composite, layered construction having a shaping surface 127, which has a generally concave curvature in its longitudinal dimension (FIG. 5) but a generally convex configuration in its lateral dimension (FIG. 3) to impart the desired curvature to that portion of the sheet engageable by the shaping surface 127.

Each shaping pad 125 is supported adjacent each opposite end on an upright post 128 suitably pivotally mounted on the press member 51. This pivotal mounting arrangement allows some lateral play in the pad 125 to move slightly along or "float" with a portion of the sheet engageable by the pad in order to render the pad self-centering or self-aligning, as more fully described in said patent application Ser. No. 1,174. Also, suitable means (not shown) are provided for adjusting the height and angular disposition of each pad 125, as desired. Additionally, means (not shown) are provided at spaced intervals along the body 126 of each shaping pad 125 for vertically adjusting portions of the pad 25 to impart the precise curvature desired in the finished glass sheet.

The shaping surface 127 of each pad 125 is provided with a cover 130 formed of a suitable, non-abrasive, heat resistant material, such as fiber glass cloth for example, to provide a smooth surface to the heat-softened glass sheet and a somewhat resiliently yieldable cushion between the glass sheet and the shaping surface to preclude marring of the former upon contact therewith. The cover 30 is in the form of an open-ended tube or sleeve flattened to form a double layered strip covering the full length and width of the pad shaping surface 127. The cover 130 is adapted to project over the ends and sides of the pad 125 and normally is disposed in a taut condition above the pad body 126 in spaced relation thereto.

The cover 130 is mounted at one end thereof in a clamp assembly 131 (FIG. 5) attached by means of a spring 132 to a support plate 133 suitably and adjustably secured to the base plate 103. The other end of cover 130 is connected to a turnbuckle (not shown) also secured to the support plate 133. The turnbuckle can be turned in the appropriate direction to induce the proper tension in cover 130 and thereby maintain the same taut and in an unwrinkled condition, particularly in the longitudinal direction, when pressed against the glass surface by the underlying shaping pad 125.

In order to maintain the cover 130 in an unwrinkled condition in a transverse direction crosswise thereof, a pair of longitudinally spaced guide means 135 (only one of which is shown in FIG. 5) are provided at the opposite ends of the shaping pad 125. Each guide means 135 is comprised of a roll segment 136 having an outer convex surface 137 and suitably secured to the support structure for the pad 125. These convex surfaces 137 impart a similarly shaped configuration to the cover 130 in a transverse direction, assisting in maintaining the latter in a wrinkle-free condition upon contact with the glass surface, thereby avoiding marring of such surface. Reference may be had to the aforementioned patent application Ser. No. 1,174 for a more detailed illustration and description of the cover, the mounting therefor, and the means maintaining the same in a taut, unwrinkled condition.

It should be understood that any number of shaping pads 125 can be employed on either or both of the press members 51 and 52. Likewise, their outside dimensions can vary, as desired, as well as the widths of the shaping rails to maintain the necessary deformation control in imparting the desired curvature to the glass sheet. For example, a shaping pad 125 may be provided between each pair of adjacent conveyor rolls 48 on lower press member 51 with the width of each pad approximating the spacing or distance between adjacent rolls when in their lowered positions. Also, the shaping rails can be widened to dispose their inner marginal edges in close proximity to the rolls 48.

Figure 7:
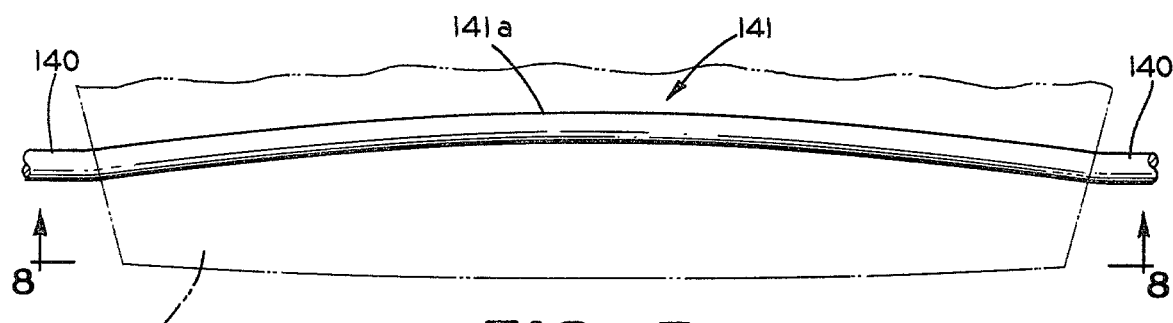
FIG. 7 is a plan view of one form of a series of conveyor rolls employed in the bending station.
Figure 8:
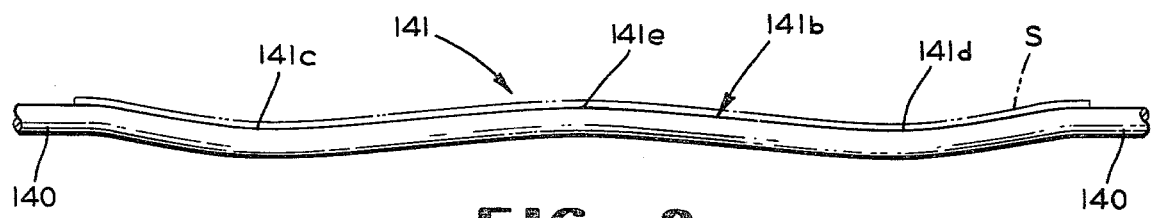
FIG. 8 is a front elevational view of the conveyor roll of FIG. 7, looking in the direction of arrows 8—8 in FIG. 7.

A significant feature of the present invention is the provision of pivotal, specially configured, conveyor rolls 48 in the bending station 36 and which are effective to preliminarily deform or bend the heat-softened glass sheets just prior to the final bending thereof by the press members 51 and 52. As best shown in FIGS. 4, 7 and 8, each conveyor roll 48 comprises straight opposite end portions 140 having a common axis and a central portion 141 deformed or bent in at least two different planes. It will be seen that, in its glass supporting position, the conveyor roll central portion 141 is bowed or arcuately curved in plan as shown at 141a in FIGS. 4 and 7 while having an undulated or sinuous shape when viewed in elevation as shown at 141b in FIG. 8. The purpose of the arcuately curved configuration is to enable the rolls 48 to adequately advance and support the heat-softened glass sheets into and within the bending station and, when pivoted, to be completely disengaged from such sheets to preclude relative frictional movement between the glass sheet surfaces and such conveyor rolls 48.

The purpose of the sinuous shape identified at 141b in FIG. 8 is to impart a complementary shaped contour to the heat-softened sheets in a transverse direction to initiate partial bending prior to final bending by the press members 51 and 52.

It should be appreciated that the heat-softened glass sheets are inversely supported on the conveyor rolls 48 and pressed in such orientation to produce a downwardly bowed or concave curvature lengthwise of the central body portion 21 thereof. Ideally, in order to preliminarily bend the sheet toward the desired curvature, the rolls 48 should be contoured with a concave curvature to impart a partially curved shape that conforms generally to that of the female press member 51 and of the desired finished bend. However, when engaged by the lower press member 51, the heat-softened glass sheet is supported only along its marginal edges on the shaping rails 105, 105a, and the regions engaged via supporting pads 125. The remainder of the glass sheet is unrestrained and sags downwardly below the shaping rails and the shaping pads. A partially bent sheet already having a downwardly bowed, concave curvature would induce greater sagging in the downward direction when engaged by the female press member and result in loss of the deformation control necessary to maintain the finished sheet within the close tolerances dictated by automobile design requirements. Accordingly, in order to inhibit or somewhat restrain such free sagging movement of the sheet's unrestrained portions, the latter are raised relative to its adjoining side portions during prebending so that upon subsequent sagging, it will attain the desired curvature within desired tolerances. To this end, each roll 48 is formed with an irregular, sinuous curvature which includes depressed portions 141c and 141d and an intermediate central raised portion 141e. Such shape functions to partially shape and initiate bending of the glass sheet in a generally concave curvature by depressed portions 141c and 141d toward its final contour while controlling the extent of sagging of the unsupported portions thereof by means of the raised roll central portion 141e.

Each conveyor roll 48 comprises an inner, hollow, flexible, substantially stationary core member 142 and an outer flexible load carrying rotatable sleeve 143. While the outer sleeve 143 is flexible for conforming to the shape of the inner core 142, it is capable of transmitting torque without significant axial twist or distortion. The sleeve 143 can be covered with an asbestos or fiber glass material 144 to provide a resiliently yieldable, heat-resistant, non-marring surface upon which the sheets are supported. One end of each inner core member 142 is mounted on a stub shaft (not shown) mounted in a suitable collar 145 journalled for rotation in spaced bearings 146 and 147 carried on a rail 148 extending along one side of the bending station 36. The outer sleeve 143 is coupled to collar 145 for rotation therewith relative to inner core member 142 by means of a suitable coupling 150, which can be of the type described and illustrated in U.S. Pat. No. 3,905,794. A pinion 151 is rigidly secured to each collar 145 and an endless drive chain (not shown) is trained about the several pinions 151 for rotating collars 145 and thereby the outer sleeve members 143 of the several rolls 48 in unison at the same angular speed about their respective chordal axes. The other opposite ends of sleeve members 143 are left free, as best shown at 152 in FIG. 4, for free rotation relative to their associated core members 142.

Figure 10:
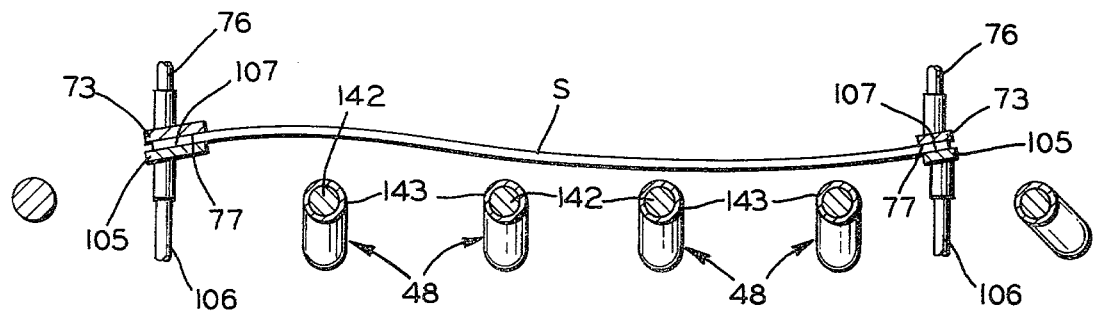
Figure 11:
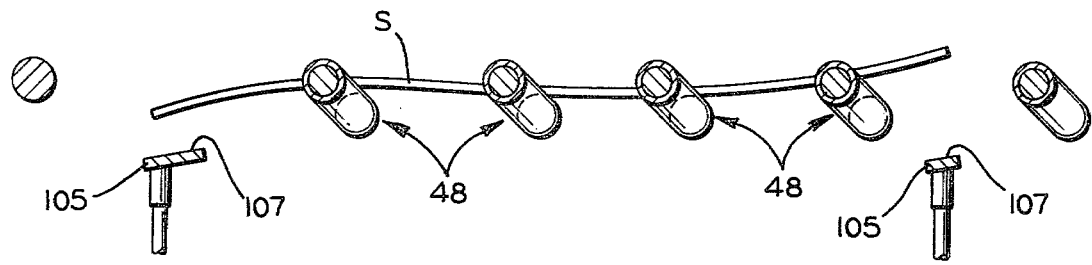

In addition to rotation about their own chordal axes, the rolls 48 are mounted for pivotal movement in unison between a first position (FIG. 9) supporting and advancing a glass sheet in the bending station prior to the final press shaping operation, a second or lowermost position (FIG. 10) in which the arcuately curved portions 141a lie in attitudes extending at the greatest angles to their first positions, and a third intermediate position (FIG. 11) in which the arcuately curved portions 141a lie in attitudes extending at angles between said first and second positions. When in the latter position, the curved portions 141a conjointly define a curved surface complementary to the curvature imparted to the glass sheet by press members 51 and 52.

The means for pivoting or shifting the conveyor rolls 48 into these three positions includes a rotatable drive shaft 153 detachably connected, by means of a quick connect-disconnect coupling 155, to the end of each core member 142 remote from the drive end. The rotatable shaft 153 is mounted in spaced bearings 156 and 157 carried on a rail 158 extending lengthwise of the bending station 36. Each shaft 153 is operatively connected to the roll pivoting or shifting apparatus, generally designated 160, comprising a coupling 161 having a first section 162 secured to the shaft 153 and a second section 163 operatively connected to the drive for actuating the shifting apparatus.

Figure 6:
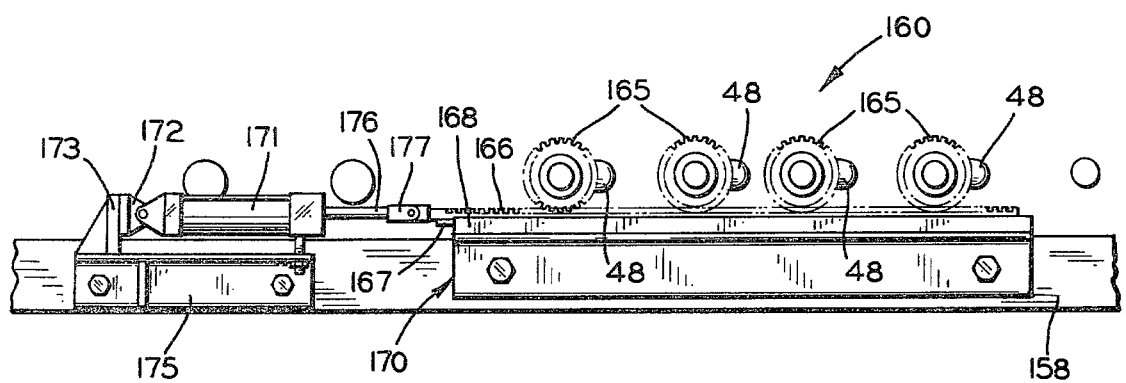
FIG. 6 is an enlarged, side elevational, diagrammatic view, looking in the direction of arrows 6—6 of FIG. 4, illustrating the actuating means for pivoting the conveyor rolls of this invention.

Reference may be had to U.S. Pat. No. 4,015,968 for a detailed description of coupling 161, as well as the entire roll shifting mechanism. For purposes of the present invention, suffice it to say that coupling section 163 is provided with a pinion gear 165 engageable with a gear rack 166 (FIG. 6) secured to the upper face of a slide 167. The slide 167 is guided for axial movement in a guide block 168 affixed by suitable fasteners to the horizontally extending leg of an angle member 170 bolted to one side of the structural member forming rail 158.

The means for actuating slide 167 and thereby gear rack 166, includes a fluid cylinder 171 pivotally mounted at its head end to a lug 172 affixed to a bracket 173 secured to the horizontal leg of an angle member 175 secured, as by means of suitable fasteners, along its vertical leg to the rail 158. Cylinder 171 is provided with the usual reciprocal piston (not shown) connected to a piston rod 176, in turn connected as shown at 177 in FIGS. 4 and 6 to the slide 167. Retraction of the piston rod 176 affects axial movement of the slide 167 and gear rack 168 toward the left, as viewed in FIG. 6, to rotate the several gears 165 in unison in a clockwise direction for shifting the arcuately curved central portions 141a of rolls 48 from an upper horizontal disposition to a lower angular disposition.

Figure 9:
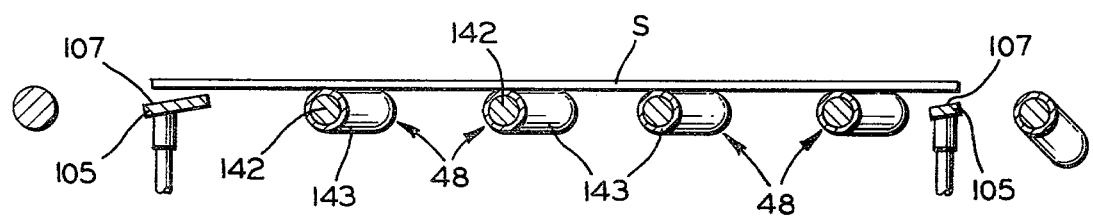
FIGS. 9-11 are vertical sectional views, showing various positions of the conveyor rolls of this invention.

The central arcuately curved portions 141a of rolls 48 are initially disposed in their upper positions shown in FIGS. 4, 7 and 9, wherein they lie in a generally common horizontal plane to support a heated flat glass sheet entering the bending station 36. The gear rack 166 is adapted to be retracted simultaneously with upward movement of the lower press member 51 so that the roll arcuately curved portions 141a are pivoted downwardly in a clockwise direction at angular attitudes or planes relative to such common horizontal plane out of engagement with a glass sheet just as the sheet is engaged by the shaping rails 105,105a and shaping pads 125 to lift the same upwardly. In this position, the arcuately curved portions 141a are in their lowermost attitudes. Before the bent sheet is returned to the rolls 48, the gear rack 166 is partially extended to pivot the roll curved portions 141a upwardly to their intermediate positions shown in FIG. 11. Then, when the bent sheet is returned to the conveyor rolls 48 after bending, the roll portions 141a, which conjointly define a curved surface complementary to the curvature imparted to the sheet, preserve the shape of the sheet and preclude any sagging out of the desired curvature as the bent sheet is conveyed out of the bending station 36. It should be understood that the degree of curvature of the arcuately curved portions 141a of conveyor rolls 48 is dictated by the desired curvature intended to be formed in the glass sheet and may vary, as desired. Once bent into the desired shape, the rolls 48 are sufficiently rigid to remain set in this shape and will not be deformed out of said shape by the loading of the glass sheets thereon. Instead of physically bending the rolls 48, variance in the curvature of the surface conjointly defined by portions 141a may be effected by manipulating coupling 161 so as to angularly rotate coupling sections 162 relative to their associated coupling sections 163 and thereby vary their angular attitudes.

Upon leaving bending station 36, the bent sheets are transferred from the series of conveyor rolls 48 to the series of conveyor rolls 50 for advancement into and through the tempering station 37. The conveyor rolls 50 also can be formed with arcuately curved central portions which conjointly define a supporting surface conforming to the curvature of the bent glass sheet S. While the conveyor rolls 50 are of identical construction and rotatable about their chordal axes in the same manner as rolls 48, preferably they are substantially fixed and not pivotal between various positions of use as the conveyor rolls 48. Thus, the curvature imparted to the glass sheet during the bending thereof is continuously maintained during its course of travel through the bending station 36 and the tempering station 37 by means of the pivotal conveyor rolls 48 and the substantially fixed conveyor rolls 50.

The mode of operation of the apparatus of this form of the invention in bending one sheet of glass is as follows:

A flat glass sheet S is loaded onto the conveyor rolls 46 at the entrance end (not shown) of the furnace 35 for movement through the heating chamber 45 wherein the sheet is heated throughout to substantially its softening point or bending temperature. This heated sheet passes through the opening 47 and is transferred onto the conveyor rolls 48, which are positioned with their arcuately curved central portions 141a disposed in a generally common horizontal plane for properly supporting the heated glass sheets being conveyed thereby. However, the configuration of the series of rolls 48 in elevation define a supporting surface having a transverse sinuous curvature and the heated sheet moving thereover conforms to and assumes a complementary shape as shown in FIG. 8. Thus, the sheet is preformed or preliminarily bent to attain downwardly bent, concave portions adjacent the opposite sides thereof to facilitate the deep bends ultimately imparted to these areas of the sheet by press members 51 and 52 while maintaining the central region of the sheet in a raised position to control the extent of sagging that will subsequently occur upon final press shaping.

Figure 12:
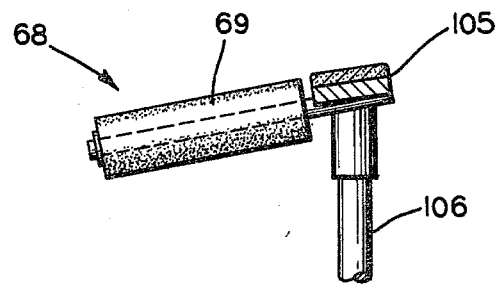
FIG. 12 is a vertical sectional view, on an enlarged scale, taken along the line 12—12 of FIG. 4.

It should be appreciated that, because of its heat-softened condition, the leading edge of a sheet within the bending station tends to sag downwardly out of the desired plane, sometimes to the extent that the leading marginal edge portion of the sheet lies inwardly in an out-of-aligned position with the shaping rail 105 of the lower press member 51. This is especially true with unusually large, heavy sheets of glass, such as that intended to be shaped by the apparatus of this invention. In order to avoid such an occurrence, a plurality of guide fingers 68 (FIGS. 4 and 12) are mounted on the lower press member 51. These guide fingers 68 are in the form of elongated rollers 69 connected to and extending inwardly from the shaping rail 105. As best shown in FIG. 12, these rollers are disposed at an angular attitude relative to a true horizontal to support the leading edge of the sheet upon any drooping or sagging thereof and guide the same toward its proper seating position on the shaping rail 105.

As the sheet S enters the bending station 36, a photoelectric cell (not shown), or other suitable detection device, senses the entry of the glass sheet into the bending station 36 for initiating a bending cycle by energizing timing mechanisms which control the actions of the press actuating cylinder 62, the roll shifting cylinder 171 and the stop cylinders 67. The timing mechanisms are so designed that the lower press member 51 begins its ascent by actuation of cylinder 62 and engages the glass sheet just about the time the leading edge thereof engages the locator stops 65. As the shaping surfaces 127 of pads 125 and shaping surfaces 107,107a of the rails 105,105a engage the glass sheet, the roll shift cylinder 171 becomes operative to retract gear rack 166 and rotate gears 165 clockwise to pivot or shift the arcuately curved portions 141a of conveyor rolls 48 downwardly in unison into their lowermost angular attitudes out of contact with the sheets so that the latter is supported on the shaping pads 125 and along its marginal edges on shaping surfaces 107,107a. The unsupported portions of the heat-softened glass sheet tend to sag upon upward movement. However, the rolls 48 have been pivoted downwardly out of the way so that the sheet unsupported portions can sag freely without contacting the rolls as otherwise would occur if left in their original common plane.

As the lower press member 51 continues to move upwardly, the combined effects of inertial and gravitational forces cause the glass sheet to sag into conformity with the shaping surfaces 107,107a and 127 of press member 51. The press member 51 continues upwardly until it reaches the end of its upstroke or the "upper dwell" position, pressing the glass sheet between the opposed rail shaping surfaces 77 and 107 of the upper and lower press members 52 and 51, as well as the opposed shaping surfaces 127 of the pads 125 mounted thereon, respectively, to impart the desired configuration to the central area of the glass sheet resulting in the central body portion 21 of the finished sheet. During the upstroke of the press member 51, the cylinders 67 are actuated to retract the locator stops 65 and permit advancement of the bent sheet when subsequently returned to conveyor rolls 48.

When the lower press member 51 reaches this above-mentioned "upper dwell" position, it also engages a suitable limit switch (not shown) to initiate operation of cylinders 112 for extending the associated piston rods 115 and swing the articulated press end sections 101 and 102 upwardly to sharply bend the glass end portions and press the same against the shaping surfaces 78 of the shaping elements 72, thereby forming sheet S into its final desired shape.

After the glass sheet has been shaped into its final configuration between the press members 51 and 52, the press member 51 is lowered and the articulated end sections 101 and 102 are swung downwardly and returned to their lowermost generally horizontal dispositions. The lower press member 51 is then lowered below the downwardly directed conveyor rolls 48 to deposit the bent sheet thereon for advancement out of the bending station 36. While the glass sheet was being bent, the conveyor rolls 48 were pivoted to shift the arcuately curved portions 141a from their lowermost attitudes to angular dispositions intermediate their uppermost and lowermost positions. In this intermediate position, the portions 141a of rolls 48 assume attitudes conjointly defining a supporting surface complementary to the curvature of the bent sheet. The bent sheet is advanced along such supporting surface at the proper rate of speed out of the bending station 36 and onto the conveyor rolls 50 for advancement into and through the tempering station 37. When the trailing edge of the bent sheet leaves the last conveyor roll 48 in bending station 36, the cylinder 171 is actuated by suitable control means responsive to a signal generated by a photocell or the like, to extend gear rack 166 and pivot the rolls 48 into their upper positions wherein the arcuately curved portions 141a lie in the aforementioned common plane in readiness for the next bending cycle. Also, the cylinders 112 are partially extended in preparation for the next bending cycle to move the articulated end sections 101 and 102 from their lowermost positions to glass receiving positions i.e. positions intermediate their uppermost bending positions and lowermost positions and in which positions the sections 101 and 102 engage the flat glass sheet upon elevation of press member 51.

The chilling means 38 in tempering station 37 comprises upper and lower blastheads 180 and 181 disposed above and below the path of movement of the glass sheets and connected to a suitable source (not shown) of cooling fluid, such as air for example. The blastheads 180 and 181 are provided with a plurality of transversely extending sections 182, each of which is formed with a plenum chamber 183 having a plurality of tubes 185 for discharging streams of cooling air against the opposite surfaces of the bent sheets moving along the path on conveyor rolls 50. The bent sheets are advanced between the blastheads at a speed promoting a proper rate of cooling to obtain a quality temper in the sheets.

Actuation of cylinders 62,67,112 and 171 is effected by conventional fluid control valves (not shown). Proper sequencing of the operation of the several control valves, as well as the variation of speed imparted to the several series of conveyor rolls 46,48 and 50, for effecting the foregoing operations in a cyclic, timed relationship is effected by conventional limit switches and/or by conventional timers incorporated in the electrical control system (not shown). Each of these switches and/or timers triggers subsequent stages of operation of the various actuators and conveyor roll drives and since such sequentially operable switches and timing arrangements are known and, per se, form no part of the present invention, no detailed description or further amplification thereof is believed necessary.

Figure 13:
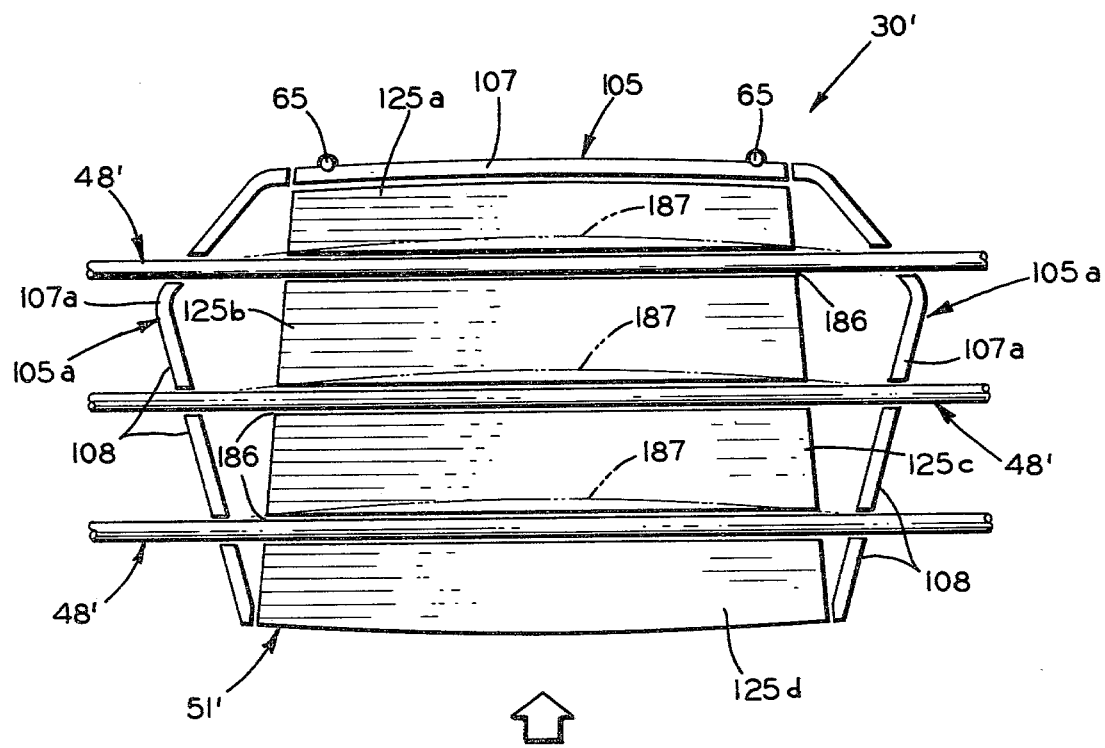
FIG. 13 is a top plan view of another form of a lower press member and conveyor roll combination constructed in accordance with this invention.

Another form of bending apparatus of this invention, generally designated 30', is shown in FIG. 13. The apparatus 30' comprises a movable lower press member 51' used in conjunction with arcuately curved conveyor rolls 48'. The lower press member 51' differs from the press member 51 hereinbefore described in connection with FIGS. 3-5 in providing four shaping pads identified as 125a, 125b, 125c and 125d having shaping surfaces, respectively, of lateral dimensions approximating the distances between adjacent conveyor rolls 48' when in their lowermost positions. The two intermediate pads 125b and 125c substantially fill the spaces between adjacent conveyor rolls 48'. The pad 125a substantially fills the space between the leading roll 48' and the forward end of shaping rail 105 while pad 125d extends from adjacent the trailing roll 48' to the rearward end of shaping rail 105, merging therewith and forming an inward extension thereof. This arrangement of pads forms a substantially continuous or comprehensive shaping surface area approximating the area of the sheet to be bent except for the elongated open areas 186 provided for the passage of the rolls 48' therethrough.

Also, as opposed to the pads 125 of the form of the invention first described, these pads 125a-125d preferably are fixedly secured to the press member 51' to prevent any lateral play thereof and thereby avoid interference with the conveyor rolls 48' as they move relative to the pads. In all other aspects, the press member 51', as well as the supporting structure for the shaping rail 105, 105a and the articulated end sections 101 and 102, is similar to that embodiment of the press member 51 shown in FIGS. 3-5 with the same reference characters being applied to similar parts. Accordingly, it is believed that no further amplification or description of the female press member 51' is required.

While the conveyor rolls 48' can be deformed in two planes similarly to those rolls 48 hereinbefore described (FIGS. 7 and 8), preferably they are bent in only one plane to define a bowed or arcuately curved central portion 187 as shown in phantom in FIG. 13. However, these rolls 48' still function to preliminarily bend the heat-softened sheet by being pivoted downwardly prior to the sheet reaching the locator stops 65 so that the arcuately curved portions 187 conjointly form an arcuately curved shaping surface. Thus, actuation of the rolls 48' before the sheet reaches the end of its forward movement thereon functions similarly to the depressed portions 141c and 141d of the rolls 48 (FIG. 8) to partially shape and initiate bending of the glass sheet in a generally concave curvature toward its ultimate contour, which final contour is imparted to the sheet by the comprehensive shaping surface formed by the shaping rail surfaces 107, 107a and pads 125a–125d. Also, since substantially the entire bottom area of the glass sheet will be engaged by this large comprehensive shaping surface, there is no need for anything comparable to the intermediate raised portion 141e of roll 48 (FIG. 8). Accordingly, pivoting the rolls 48' in advance of final glass positioning thereon serves the same function as the sinuous curvatures formed in rolls 48. However, such sinuous curvatures can be provided in the rolls 48', if desired. The operation of the second form of the bending apparatus 30' also differs in that the lower press member 51' is not raised until the rolls 48' are pivoted into their fully lowermost positions because of the limited clearance offered by the open areas 186 formed in the comprehensive shaping surface.

From the foregoing, it is apparent that the objects of this invention have been fully accomplished. As a result of this invention, an improved method and apparatus is provided for bending glass sheets in a mass production operation to heretofore unattainable complex shapes. The provision of specially configured conveyor rolls deformed or bent in one or two different planes to preliminarily bend the heat-softened glass sheets prior to the final shaping thereof offers versatility in selectively bending glass sheets into a wide variety of complex and/or compound shapes.

It is to be understood that the forms of the invention herewith shown and described are to be taken as an illustrative embodiment only of the same, and that various changes in the shape, size and arrangement of parts, as well as various procedural changes, may be resorted to without departing from the spirit of the invention.

We claim:

1. A method of bending a glass sheet comprising: heating a glass sheet to the softening point thereof, supporting and conveying said heated sheet on a series of conveyor rolls to an advanced position in spaced relation to a press member having a first shaping surface corresponding to the marginal outline of said heated sheet and at least one second shaping surface located within the outline of said first shaping surface, said conveyor rolls having curved portions in at least one plane thereof, preliminarily bending said glass sheet on said conveyor roll curved portions as said sheet advances to said advanced position, and moving said first and second shaping surfaces relative to said rolls for engaging said sheet and moving the same toward and against an opposed press member to impart a final desired shape to said sheet.

2. A method according to claim 1, wherein said conveyor rolls are formed with irregular curvatures conjointly defining an irregular shaping surface causing the heated sheet to conform to such irregular shaping surface in imparting said preliminary bend thereto.

3. A method according to claim 1, including guiding said sheet to said advanced position above said first shaping surface.

4. Apparatus for bending a glass sheet comprising: a frame, at least one movable bending member mounted on said frame, said bending member comprising an outline shaping rail provided with a shaping surface conforming to the marginal outline of the glass to be bent and at least one shaping pad mounted within said shaping rail and having a shaping surface thereon engageable with an interior portion of the sheet, a plurality of conveyor rolls mounted on said frame for supporting and conveying a glass sheet above said shaping surfaces, said shaping pad mounted between adjacent conveyor rolls, said conveyor rolls having contoured surfaces for preliminarily bending said glass sheet, and means for moving said bending member and thereby said shaping surfaces upwardly relative to said conveyor rolls to effect final bending of said glass sheet.

5. Apparatus according to claim 4, wherein said shaping rail has a front end portion and a rear end portion, and means adjacent said rear end portion for guiding said sheet into a desired position relative to said shaping rail rear end portion.

6. Apparatus according to claim 5, wherein said guiding means comprises a plurality of laterally spaced fingers projecting inwardly from said shaping rail rear end portion.

7. A method of bending a glass sheet comprising: heating the glass sheet to the softening point thereof, supporting and conveying said heated sheet on a series of conveyor rolls to an advanced position in spaced relation to a press member having a first shaping surface corresponding to the marginal outline of said heated sheet and at least one second shaping surface located within the outline of said first shaping surface, preliminarily bending glass sheet as said sheet advances to said advanced position, moving said first and second shaping surfaces relative to said rolls for engaging said sheet and moving the same toward and against an opposed press member to impart a final desired shape to said sheet, said conveyor rolls having arcuately shaped supporting portions lying in a common horizontal plane, and swinging said conveyor roll supporting portions downwardly at angular attitudes relative to said common plane to conjointly define a curved shaping surface for imparting said preliminary bend to said sheet prior to engagement thereof with said first and second shaping surfaces.

8. A method of bending glass sheet comprising: heating a glass sheet to the softening point thereof, supporting and conveying said heated sheet on a series of conveyor rolls to an advanced position in spaced relation to a press member having a first shaping surface corresponding to the marginal outline of said heated sheet and at least one second shaping surface located within the outline of said first shaping surface, preliminarily bending said glass sheet as said sheet advances to said advanced position, moving said first and second shaping surfaces relative to said rolls for engaging said sheet and moving the same toward and against an opposed press member to impart a final desired shape to said sheet, said conveyor rolls being provided with central portions having arcuately shaped curvatures in one plane thereof adapted to support said sheet in one position thereof and pivotal to an angular position disengaging said roll central portions from said sheet, said conveyor roll central portions additionally formed with irregular curvatures in another plane of said central portions for imparting said preliminary bend to said glass sheet prior to engagement thereof with said first and second shaping surfaces.

9. Apparatus for bending a glass sheet comprising: a frame, at least one bending member mounted on said frame and having an outline shaping rail provided with a shaping surface conforming to the marginal outline of the glass sheet to be bent, at least one shaping element mounted within said shaping rail and having a shaping surface thereon engageable with an interior portion of the sheet, a plurality of conveyor rolls mounted on said frame for supporting and conveying the glass sheet above said shaping surfaces, said conveyor rolls having contoured surfaces for preliminarily bending said glass sheet prior to effecting the final bending thereof by said bending member, said conveyor roll contoured surfaces formed by arcuately curved central portions adapted to support said sheet in a horizontal plane in one position thereof and pivotable to angular positions conjointly defining a curved shaping surface for imparting said preliminary bend to said sheet prior to engagement thereof by said rail and element shaping surfaces of said bending member.

10. Apparatus according to claim 9, including a plurality of laterally spaced shaping elements mounted within said shaping rail and having shaping surfaces engageable with said glass sheet upon movement of said bending member relative to said conveyor rolls.

11. Apparatus according to claim 10, wherein said shaping surfaces of said elements have lateral dimensions approximating the distances between adjacent conveyor rolls when disposed in the extreme angular positions thereof.

12. Apparatus for bending a glass sheet comprising: a frame, at least one bending member mounted on said frame and having an outline shaping rail provided with a shaping surface conforming to the marginal outline of the glass sheet to be bent, at least one shaping element mounted within said shaping rail and having a shaping surface thereon engageable with an interior portion of the sheet, a plurality of conveyor rolls mounted on said frame for supporting and conveying a glass sheet above said shaping surfaces, said conveyor rolls having contoured surfaces for preliminarily bending said glass sheet prior to effecting the final bending thereof by said bending member, said conveyor rolls being provided with central portions having arcuately shaped curvatures in one plane thereof adapted to engage and support said sheet in one position thereof and pivotable to an angular position disengaging said roll central portions from said sheet, said conveyor roll contoured surfaces being defined by irregular curvatures in another plane of said central portions for imparting said preliminary bend to said glass sheet prior to engagement thereof by said rail and element shaping surfaces of said bending member.

13. Apparatus according to claim 12, wherein each of said irregular curvatures is of a sinuous shape having a central raised portion and depressed portions on opposite sides, respectively, of said raised portion.

14. Apparatus according to claims 9 or 12, wherein each of said conveyor rolls comprises an inner core member and an outer load supporting sleeve, and means rotating said sleeve about said inner core member.

* * * * *

UNITED STATES PATENT AND TRADEMARK OFFICE
CERTIFICATE OF CORRECTION

PATENT NO. : 4,305,746

DATED : December 15, 1981

INVENTOR(S) : Floyd T. Hagedorn et al

It is certified that error appears in the above-identified patent and that said Letters Patent are hereby corrected as shown below:

```
Col. 6, line 37, "30" should be --130--
Col. 9, line 18, "168" should be --166--
Col. 14, line 37, after "bending" insert --said--
```

Signed and Sealed this

Fifteenth Day of June 1982

[SEAL]

Attest:

GERALD J. MOSSINGHOFF

Attesting Officer  Commissioner of Patents and Trademarks